United States Patent [19]

DiPrima et al.

[11] Patent Number: 5,062,590
[45] Date of Patent: Nov. 5, 1991

[54] VENTING AND SEALING MECHANISM

[75] Inventors: James J. DiPrima, Medford; Frank K. Porter, Jr., Billerica, both of Mass.

[73] Assignee: Raytheon Company, Lexington, Mass.

[21] Appl. No.: 446,738

[22] Filed: Dec. 6, 1989

[51] Int. Cl.$^5$ ............................................. B64D 11/00
[52] U.S. Cl. ................... 244/118.5; 244/3.16; 98/1.5
[58] Field of Search ............... 244/118.5, 3.16; 98/2, 98/1.5; 137/859, 903, 843, 860

[56] References Cited

U.S. PATENT DOCUMENTS

| | | | |
|---|---|---|---|
| 2,515,639 | 7/1950 | Draney | 98/1.5 |
| 3,137,308 | 6/1964 | Machlanski et al. | 98/1.5 |
| 3,194,143 | 7/1965 | Wood | 98/1.5 |
| 3,270,771 | 9/1966 | Morgan et al. | 137/859 |
| 3,401,719 | 9/0196 | Rosser | 137/859 |
| 3,742,495 | 6/1973 | Diamantides | 342/64 |
| 3,804,113 | 4/1974 | Garcea | 137/859 |
| 4,324,097 | 4/1982 | Schmitt et al. | 137/859 |
| 4,390,152 | 6/1983 | Jorgensen | 244/118.5 |
| 4,463,774 | 8/1984 | Gorges et al. | 98/1.5 |
| 4,708,166 | 11/1987 | Kobold | 137/859 |

*Primary Examiner*—Joseph F. Peters
*Assistant Examiner*—Christopher P. Ellis
*Attorney, Agent, or Firm*—Donald F. Mofford; Richard M. Sharkansky

[57] ABSTRACT

Venting and sealing apparatus to control the barometric pressure of air surrounding the guidance apparatus within a missile is shown to consist of: (a) a metallic valve body made up of a cup with a perforate bottom and a lip attached to the shell of the missile surrounding an opening formed through the shells; and (b) a plug within the cup, the position of such plug relative to the perforate bottom being controlled by the relationship between the barometric pressure of the atmosphere outside the missile and the barometric pressure of the air surrounding the guidance apparatus.

5 Claims, 1 Drawing Sheet

VENTING AND SEALING MECHANISM

This invention was made with Government support under Contract No. N00024-87-C-5320 awarded by the Department of the Navy. The Government has certain rights in this invention.

BACKGROUND OF THE INVENTION

This invention pertains generally to guided missiles, and particularly to apparatus and method for controlling the temperature within such missiles during flight.

It is well known in the art of guided missiles (hereinafter referred to simply as "missiles") that aerodynamically induced heating during flight may seriously reduce the performance of any known types of guidance apparatus in missiles. It is also known that the problems associated with aerodynamically induced heating are exacerbated when the barometric pressure of air within the guidance section of a missile is not adjusted with any change in altitude of a missile. Thus, as altitude increases during flight it is desirable to vent the guidance section of a missile so that the barometric pressure within the guidance section is lowered to correspond with the barometric pressure of the enveloping atmosphere. On the other hand, as altitude decreases during flight it is desirable to prevent the barometric pressure within the guidance section from being increased to correspond with the enveloping barometric pressure.

It is evident that any satisfactory method or mechanism used to control the barometric pressure within the guidance section of a missile may not detract in any way from the electrical or mechanical characteristics of any part of a missile. It follows then that care must be taken not to affect the streamlining of the missile and not to allow electromagnetic or radio frequency interference with the operation of any elements in the guidance section.

SUMMARY OF THE INVENTION

With the foregoing background of the invention in mind, it is a primary object of this invention to provide a venting and sealing mechanism for the guidance section of a missile in flight, such mechanism being adapted to respond to the difference between the barometric pressures inside and outside a missile in flight to vent or to seal the guidance section as required to maintain the optimum barometric pressure within the guidance section.

Another object of this invention is to provide a venting and sealing mechanism that is mounted on a missile in such a way that the integrity of the streamlining of the missile is preserved.

Still another object of this invention is to provide a venting and sealing mechanism that is effective to prevent radio frequency interference with elements in the guidance section of a missile and to inhibit unwanted emission of radio frequency energy from such section.

The foregoing and other objects of this invention are generally attained by a valve between the guidance section and the outside of the missile, the valve being made up of a metallic hollow cylindrical cup with a perforate bottom and an open top affixed to the inside of the skin of a missile so that air may pass from the guidance section to the atmosphere, or vice versa, and a pressure-sensitive plug disposed between the skin of the missile and the perforate bottom of the cup, such plug being out of contact with the perforate bottom when venting of the air in the guidance section is required and in contact with the perforate bottom when sealing of the air in the guidance section is required.

BRIEF DESCRIPTION OF THE DRAWING

For a more complete understanding of this invention, reference is now made to the following description of the accompanying drawings wherein.

DESCRIPTION OF THE PREFERRED EMBODIMENT

Figure 1:
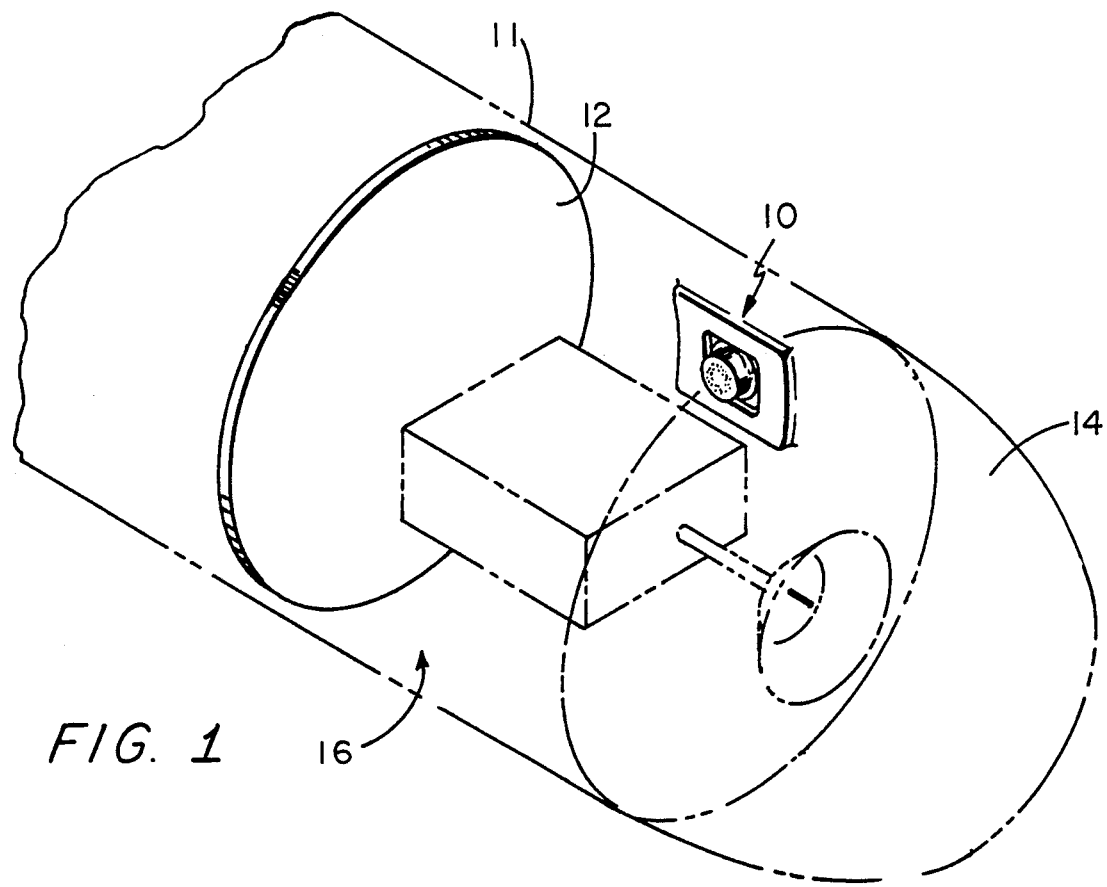
FIG. 1 is a sketch, greatly simplified, of a venting and sealing mechanism according to this invention in place in a guided missile.
Figure 2:
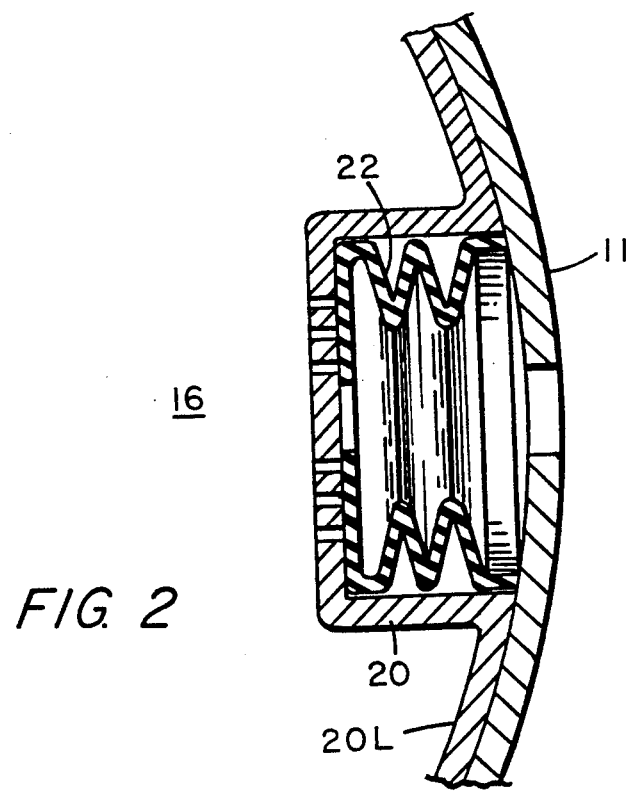
FIG. 2 is a simplified cross-section of a venting and sealing mechanism as used in FIG. 1.

Referring now to the FIGURES, it may be seen that the contemplated venting and sealing mechanism 10 is mounted in an appropriately shaped opening in the shell 11 of a missile (not numbered). The portion of the shell 11 adjacent to the venting and sealing mechanism 10, a bulkhead 12 and a radome 14 encompass a space hereinafter referred to as the guidance section 16. Conventional seeker and guidance command apparatus (not numbered) is mounted within the guidance section 16. The venting and sealing mechanism 10 is arranged: (a) to allow air within the guidance section 16 to be vented to the atmosphere whenever the altitude of the missile (not numbered) increases; and (b) to prevent air from the atmosphere from being admitted to the guidance section 16 whenever the altitude of the missile (not numbered) decreases.

The venting and sealing mechanism 10 here is made up of: (a) a metallic cup 20 having a perforate bottom and an open end (with a lip 20L integrally formed around the open end so that the cup 20 may be affixed in any convenient manner to cover an opening (not numbered) in the shell 11; and (b) a pressure-sensitive plug 22 having an annular end shaped to cover the openings in the perforate bottom of the cup 20. The individual openings in the perforate bottom of the cup 20 are proportioned so that the bottom is always substantially opaque to electromagnetic energy at the frequency of operation of the seeker and guidance command apparatus. Further, the individual openings through the bottom of the cup 20 are disposed toward the perimeter of the bottom of the cup 20 so that when the annular end of the plug 22 is in contact with the bottom of the cup 20, i.e., when the barometric pressure of the atmosphere is substantially greater than the barometric pressure in the guidance section 16, the openings in the bottom of the cup 20 are covered.

The annular end of the plug 22 is integrally formed with a bellows (not numbered) that is disposed as shown to bear against the inside of the shell 11 of the missile. The plug 22 is fabricated from an elastometer and is so dimensioned that, so long as the barometric pressure of the atmosphere outside the missile is equal to, or greater than, the barometric pressure of the air within the guidance section 16, the annular end is in contact with the perforate bottom of the cup 20 to seal the guidance section 16. However, when the barometric pressure of the atmosphere outside the missile is less than the barometric pressure of the air within the guidance section 16, the resulting imbalance in barometric pressures on the two sides of the annular end of the plug 22 causes the annular end to move away from the perforate bottom of the cup 20, thereby venting the air within the guidance section 16.

Having described a preferred embodiment of this invention, it will now be apparent to one of skill in the art that changes may be made without departing from our inventive concepts. Thus, the bellows need not be incorporated in the plug 22 if the annular end is shaped and dimensioned so as to be movable. Further, a flapper valve could be installed on the skin of the missile to permit venting and to prevent ingress of any air from the atmosphere. In view of the foregoing it is felt that this invention should not be restricted to the disclosed embodiment, but rather should be limited only by the spirit and scope of the appended claims.

What is claimed is:

1. A missile comprising:
    (a) a shell having a space enclosed thereby normally isolated from air surrounding the missile;
    (b) a guidance apparatus disposed within the space; and
    (c) venting and sealing mechanism disposed between the space and the atmosphere, the venting and sealing mechanism comprising:
        (i) a cup fabricated from a metallic material, the cup having a lip affixed to an inner surface of the shell to encompass an opening formed through the shell and having a perforate bottom with individual holes adjacent to the space within the missile wherein the individual holes in the perforate bottom of the cup have transverse dimensions to render the perforate bottom opaque to radio frequency energy utilized by the guidance system;
        (ii) a plug, fabricated from an elastometer and movably mounted within the cup, the plug having an annular end adapted to cover the individual holes in the perforate bottom; and
        (iii) a bellows having a first end and a second end, the first end of the bellows affixed to the plug and the second end of the bellows disposed adjacent the inner surface of the shell within the lip of the cup.

2. A missile comprising:
    (a) a shell having a space enclosed thereby;
    (b) a guidance section disposed within the space wherein a guidance apparatus is mounted; and
    (c) means, responsive to a difference of pressure between pressure within the space and pressure of an atmosphere surrounding the missile, for venting air having a barometric pressure within the space from said space to the atmosphere surrounding the missile when the barometric pressure of said air within the space is greater than the barometric pressure of air in the atmosphere surrounding the missile and for preventing air in the atmosphere from entering the space when the barometric pressure of the air within the space is less than the barometric pressure of air of the atmosphere.

3. The missile as recited in claim 2 wherein said means for venting and for preventing comprises means for rendering opaque said venting and preventing means to radio frequency energy utilized by the guidance apparatus.

4. The missile as recited in claim 3 wherein the means for venting and preventing comprises:
    (a) a cup having a perforate bottom portion and a side wall portion; and
    (b) a plug slidably disposed within the cup, such plug having an end portion engagable with the perforate bottom portion and a bellows, the bellows being disposed adjacent the sidewall portion, the perforate bottom portion of the cup being disposed in contact with the end portion of the plug when the barometric pressure of air in the atmosphere is equal to or greater than the barometric pressure of the air within the space and the perforated bottom portion of the cup being displaced from the end portion of the plug when the barometric pressure of air in the atmosphere is less than the barometric pressure of the air within the space.

5. A method of venting air within a guidance section of a missile comprising the steps of:
    (a) allowing air having a barometric pressure within the guidance section to be vented to the atmosphere whenever the barometric pressure of the air within the guidance section of the missile is greater than the barometric pressure of the atmosphere; and
    (b) preventing air from the atmosphere from being admitted to the guidance section whenever the barometric pressure of the air within the guidance section of the missile is less than the barometric pressure of the atmosphere.

* * * * *